Feb. 11, 1947.  C. M. OSTERHELD  2,415,525
TANK HEATER CONTROL SYSTEM
Filed Oct. 9, 1944
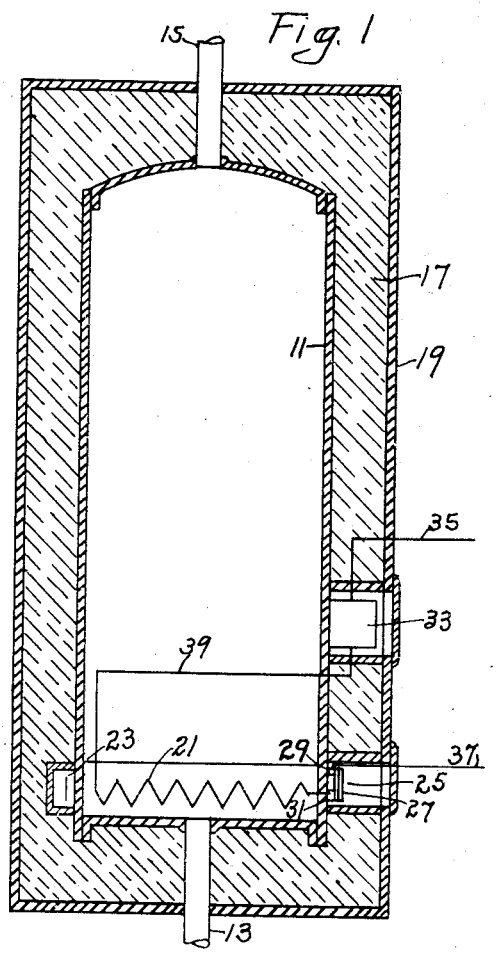
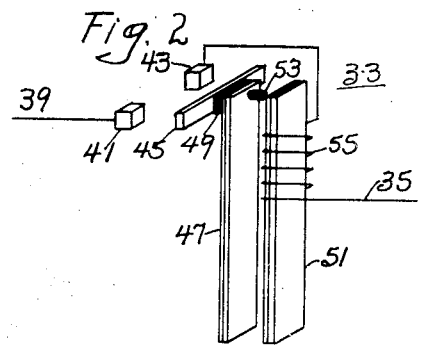
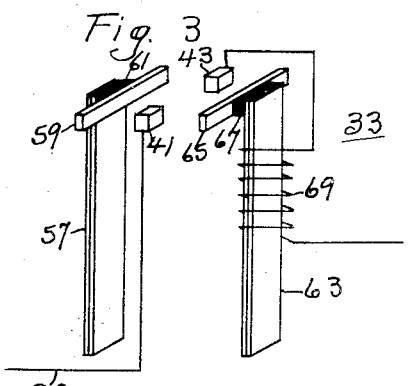
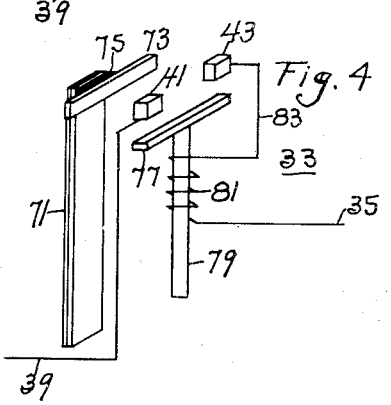
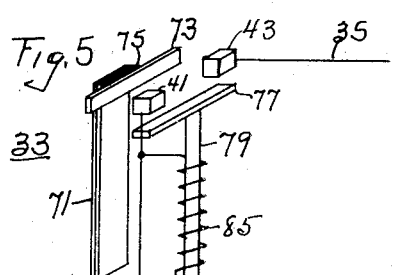
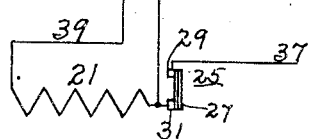
INVENTOR.
CLARK M OSTERHELD.
BY
ATTORNEY Patented Feb. 11, 1947

2,415,525

UNITED STATES PATENT OFFICE 2,415,525

TANK HEATER CONTROL SYSTEM

Clark M. Osterheld, Stoughton, Wis., assignor to McGraw Electric Company, Elgin, Ill., a corporation of Delaware Application October 9, 1944, Serial No. 557,876

5 Claims. (Cl. 219—39)

My invention relates to electric heating and particularly to control systems for electric heaters of domestic hot water tanks.

An object of my invention is to provide a control system for a single electric heater of a usual domestic hot water tank embodying but two thermally actuable heater control switches that shall be jointly effective to prevent energization of the heater at any time if only a small amount of hot water has been withdrawn from the tank and that shall be effective to cause energization of the heater immediately in case of withdrawal of a predetermined larger amount of hot water from the tank, which energization, when combined with a certain routine of use of hot water in a home, will occur during the off-peak period of the late night hours and will continue until substantially all of the water in the tank is hot.

In the drawing,

Figure 1 is a view in vertical section through a usual domestic hot water tank having associated therewith the control system embodying my invention, Fig. 2 is an exploded perspective view of one of the thermally actuable heater control switches embodying my invention, and, Figs. 3, 4, and 5 are exploded perspective views of three different modifications of thermally actuable heater control switches embodying my invention, the switches of Figs. 2, 3, 4, and 5 being shown schematically only.

Referring first of all to Fig. 1 of the drawing, I have there illustrated an ordinary domestic hot water tank 11 having a lower cold water inlet pipe 13, an upper hot water outlet pipe 15 and being surrounded by a mass 17 of heat-insulating material, which is held in proper operative position around the tank by an outside casing 19. I provide also preferably, but not necessarily, a single electric heater 21, which may be of the clamp-on type and be positioned in a tunnel 23. All of the above described elements are standard and old in the art and constitute no part of my present invention.

I provide also a lower thermally actuable heater control switch 25, which includes a bimetal bar 27 having one end thereof mounted on a fixed contact 29, while the other end thereof is adapted to engage with and be disengaged from a second fixed contact 31. While I have shown a specific embodiment of a thermally actuable switch, I do not desire to be limited thereto, since any other assembly effective for the same purpose as switch 25 may be used in place thereof. The design, construction, and adjustment of the lower thermally actuable switch 25 is such that it will be in closed position when subject to cold water in the tank and that it will be in open position when subject to hot water in the tank. When I speak of cold water, I mean water the temperature of which is on the order of 130° F.; and when I speak of hot water, I mean water the temperature of which is on the order of 150° F., or slightly over. The position of switch 25 is adjacent the lower end portion of tank 11 such that it will cause deenergization of the heater 21, with which it is connected in series circuit, when substantially all of the water in the tank is hot.

I provide further a second thermally actuable heater control switch designated generally by numeral 33, which switch is mounted in heat-receiving relation on the tank intermediate the ends of the tank. While I have shown switch 33 located at or about one-third of the total height of the tank from the lower end thereof, I do not desire to be limited thereto, since I may locate it on the tank either at a somewhat higher position or at a somewhat lower position, all as will be hereinafter discussed.

I provide two supply circuit conductors 35 and 37, of which supply circuit conductor 35 is connected to one terminal of the upper thermal switch 33, while the other terminal of switch 33 is connected by a conductor 39 with one terminal of electric heater 21. The other terminal of heater 21 is connected to contact member 31, while the second supply circuit conductor 37 is connected to contact 29. This circuit therefore connects the two thermally actuable heater control switches in series electric circuit with each other and with the heater 21, so that heater 21 will be controlled by the joint action of the two thermally actuable switches 25 and 33.

Referring now to Fig. 2 of the drawing, I have there shown schematically one form of upper thermally actuable switch 33. In this modification I provide a pair of spaced, fixed contact members 41 and 43, which are insulatedly supported in any suitable manner. A contact bridging member 45 is adapted to be moved into engagement with or out of engagement with the fixed contacts 41 and 43. For this action I provide a suitable bimetal bar 47 having say its lower end fixedly secured in good heat-receiving relation to the tank, while its upper end has secured thereto a bar or strip 49 of electric-insulating material to which the bridging member 45 is secured. I provide further a second bimetal bar 51, which may be supported by a heat-insulating block not shown, or by a heat-conducting supporting block, also not shown, at its lower end. The upper free movable end is adapted, when bimetal bar 51 is heated, to engage a lug 53, of electric-insulating material secured to the upper end of bimetal bar 47. I provide further a heating coil 55 which is insulatedly mounted on and supported by the second bimetal bar 51 and which is made of a resistance strip or wire having sufficient area of cross section to be traversed by the heater current and to translate into heat only a small amount of energy. The amount of energy translated into heat is, however, sufficient to cause flexing of the bimetal bar 51 in a counter-clockwise direction in a few minutes of time.

The design, construction, and adjustment of the thermal heater control switch shown in Fig. 2 is such that when it is subject to cold water in the tank, the contact bridging member 45 will be moved into engagement with the fixed contacts 41 and 43 immediately; and when it is subject to hot water, the contact bridging member 45 will be moved out of engagement therewith. In case the tank is filled with cold water to a point above the position of the second thermal switch 33, the first or lower thermal switch 25 will also be subject to cold water, with the result that current will flow from the supply circuit conductors through the two switches and the electric heater. As has been hereinbefore set forth, the design of the second bimetal bar 51 is such that when it is heated by the current traversing the heater, it will, within a very few minutes, flex in a counter-clockwise direction against lug 53 to thereby hold the first biemtal bar 47 in a flexed position such that the bridging member 45 will be held in engagement with contacts 41 and 43. This means that even though the upper thermal switch 33 is subject to hot water, as will happen in due course, the contact bridging member 45 will be maintained in engagement with fixed contacts 41 and 43 by means of the second bimetal bar 51. It is to be understood that the length and strength of the first bimetal bar 47 is such that it can be held in its flexed position by the heavier bimetal bar 51. The heater 21 will be deenergized by the lower thermal switch 25 when substantially all of the water in the tank is hot.

Referring now to Fig. 3 of the drawing, I have there shown a modified form of the second thermally actuable heater control switch embodying fixed contact members 41 and 43 supported by suitable means not shown in the drawing. I provide a first bimetal bar 57 having a contact bridging member 59 supported at its upper end by a bar or strip 61 of electric-insulating material, the bimetal bar 57 being adapted, when subject to cold water in the tank, to flex in a clockwise direction to cause engagement of bridging member 59 with fixed contact members 41 and 43. When subject to hot water in the tank, bimetal bar 57 will flex in a counter-clockwise direction to cause disengagement of bridging member 59 from the fixed contacts 41 and 43.

I provide a second bimetal bar 63 having its lower end fixedly supported in substantially the same manner as described hereinbefore for bimetal bar 51 of Fig. 2, and supporting a second contact bridging member 65 on its upper end, a strip or bar 67, of electric-insulating material, being interposed between the bimetal bar 63 and bridging member 65. The design, construction, and adjustment of bimetal bar 63 is such that, when subject to cold water in the tank, the contact bridging member 65 will be held out of engagement with contacts 41 and 43, but when a coil 69, insulatedly supported on bimetal bar 63, has been traversed for a relatively short time by the current traversing the electric heater 21, the bimetal bar 63 will have flexed in a counter-clockwise direction so that contact bridging member 65 will be in engagement with contacts 41 and 43. The design, construction, and adjustment of the first bimetal bar 57 is such that, when subject to cold water in the tank, it will flex in a clockwise direction to cause engagement of the bridging member 59 with fixed contacts 41 and 43, and when subject to hot water in the tank, it will flex in a counter-clockwise direction to cause disengagement of the bridging member 59 from contacts 41 and 43.

Referring now to Fig. 4 of the drawing, I have there shown a second modification of the upper thermally actuable heater control switch 33, including a bimetal bar 71 which has its lower end fixedly supported in good heat-conducting relation on the tank and which supports a contact bridging member 73 at its upper end, a strip or bar 75 of electric-insulating material being interposed between the bridging member 73 and the upper end of bimetal bar 71. When bimetal bar 71 is subject to cold water in the tank, it will flex in a clockwise direction so that bridging member 73 will be in engagement with two fixed contacts 41 and 43.

I provide a second contact bridging member 77, which is supported on an armature core 79 of an electromagnetic relay or contactor, including, in addition, a coil 81 adapted to be traversed by the same current as traverses the electric heater 21. Contact bridging member 43 is adapted to be connected by a conductor 83 to one terminal of coil 81, the other terminal of which is connected to supply circuit conductor 35. When the thermally actuable heater control switch unit shown in Fig. 4 is subject to cold water in the tank, contact bridging member 73 will be moved into engagement with fixed contacts 41 and 43, thereby closing a circuit through electric heater 21, as well as through the magnetic coil 81. Contact bridging member 77 will be quickly moved upwardly into engagement with fixed contacts 41 and 43, so that the energizing circuit through electric heater 21 will be maintained even though bimetal bar 71 becomes subject to hot water in the tank, with attendant flexure thereof in a counter-clockwise direction with disengagement of bridging member 73 from fixed contacts 41 and 43.

Referring now to Fig. 5, I have there shown a modification of the thermally actuable switch 33, in which the coil 85 is adapted to be connected in shunt electric circuit with the heater 21. When the circuit is closed by the upper thermally actuable switch 33, current will also flow through coil 85, causing quick upward movement of the core 79 and the bridging member 77, so that the latter will engage contacts 41 and 43 to maintain the circuit through heater 21 in closed position even though bimetal bar is subject to hot water and moves bridging member 73 out of engagement with fixed contacts 41 and 43.

The design, construction, and adjustment of the respective upper thermally actuable heater control switch units shown in Figs. 2, 3, and 4 is such, as has already been hereinbefore set forth, that when subject to cold water in the tank, the first contact bridging member will be moved into engagement with the fixed contacts, which bridging member will be moved out of engagement with the fixed contacts when the first bimetal bar is subject to hot water, but the energizing circuit through the electric heater will be continued at or through the upper switch unit by action of either the second bimetal bar or of the electromagnetic relay shown in Fig. 4 or Fig. 5.

The control system embodying my invention is therefore effective to prevent energization of the electric heater if only enough hot water has been withdrawn from the tank during any part of a twenty-four hour day to subject only the lower thermally actuable heater control switch 25 to cold water, but will be effective to cause immediate energization of the heater in case enough hot water is withdrawn from the tank to cause not only the lower thermally actuable switch to be subject to cold water, but also the upper thermally actuable switch unit, in which case energization of the heater is immediate and will be effected first through one contact bridging member of the upper switch unit and will then be continued either through the one bridging member or through a second bridging member, to continue until substantially all of the water in the tank is hot, when deenergization of the heater is effected by the lower thermally actuable switch.

It is pointed out here that no time-controlled switch is provided to cause energization of the tank heater to take place during off-peak periods, but reliance may be placed on ordinary habits of people in a home to cause energization of the tank heater to occur during off-peak periods. Thus with a tank of suitable size, so that the amount of hot water used in the late afternoon and early evening hours is such as to cause entry into the tank of only enough cold water to subject only the lower thermal switch to cold water, energization of heater 21 will not take place. However, if the habits of the people are such as to call for the use of relatively large amounts of hot water in the later evening hours, as by taking baths before retiring, the amount of cold water entering the tank will be sufficient to subject both thermal control switches to cold water, with the result that energization of the heater will start at the start of the off-peak period during night hours, which may be at any period from 10 p. m. to midnight.

Individual variations from the above described general habits, may be taken care of by varying the position of the upper thermal switch unit 33. Thus if this upper switch is mounted on the tank at about one-third of the total height of the tank above the lower end, it will cause energization of the electric heater with entry into the tank of a lesser amount of cold water than would be the case if the upper switch were mounted on the tank at about mid-height thereof, so that the position of the upper thermally actuable switch unit will permit of taking care of individual variations of the habits of respective families.

Various modifications may be made in the system embodying my invention without departing from the spirit and scope thereof, and all such modifications clearly coming within the scope of the appended claims shall be considered as part of my invention.

I claim as my invention:

1. In a control system for a domestic hot water tank, the combination with an electric circuit, a single electric heater in said circuit and a thermally-actuable heater control switch adapted to be subject to tank water temperature at the lower portion of said tank and adapted to be in closed position when subject to cold water and to be in open position when subject to hot water in the tank, of an upper heater control switch adapted to be subject to tank water temperature intermediate the ends of the tank and comprising a single pair of fixed contacts connected in said circuit, a contact bridging member adapted to be moved into and out of engagement with said fixed contacts to close and open said heater circuit, a bimetal bar supporting and actuating said bridging member into closed circuit and into open circuit position in accordance with its subjection to cold and to hot water, and heater current-controlled means for maintaining said switch in closed position when said bimetal bar is subject to hot water.

2. In a control system for a domestic hot water tank, the combination with an electric circuit, a single electric heater in said circuit and a thermally-actuable heater control switch adapted to be subject to tank water temperature at the lower portion of the tank and adapted to be in closed position when subject to cold water and to be in open position when subject to hot water in the tank, of an upper heater control switch adapted to be subject to tank water temperature intermediate the ends of the tank and comprising a single pair of fixed contacts connected in said circuit, a contact bridging member adapted to be moved into and out of engagement with said fixed contacts, a first bimetal bar supporting and actuating said bridging member into engagement with said fixed contacts when subject to cold water in the tank and a heater current controlled bimetal bar for holding said contact bridging member in circuit closing engagement with said fixed contacts when said first bimetal bar is subject to hot water in the tank to energize said circuit and said heater.

3. In a control system for a domestic hot water tank, the combination with an electric circuit, a single electric heater in said circuit and a thermally-actuable heater control switch adapted to be subject to tank water temperature at the lower portion of the tank, and adapted to be in closed position when subject to cold water and to be in open position when subject to hot water in the tank, of an upper heater control switch adapted to be subject to tank water temperature intermediate the ends of the tank comprising a single pair of fixed contacts connected in said circuit, a contact bridging member adapted to be moved into and out of engagement with said fixed contacts, a bimetal bar supporting and actuating said bridging member into engagement with said fixed contacts when subject to cold water in the tank, a second contact bridging member adapted to be engaged with and be disengaged from said fixed contacts and heater-current controlled means for causing engagement of said second contact bridging member with said fixed contacts.

4. In a control system for a domestic hot water tank, the combination with an electric circuit, a single electric heater in said circuit and a thermally-actuable heater control switch adapted to be subject to tank water temperature at the lower portion of the tank and adapted to be in closed position when subject to cold water and to be in open position when subject to hot water in the tank, of an upper heater control switch adapted to be subject to tank water temperature intermediate the ends of the tank comprising a single pair of fixed contacts connected in said circuit, a contact bridging member adapted to be moved into and out of engagement with said fixed contacts, a bimetal bar supporting and actuating said bridging member into engagement with said fixed contacts when subject to cold water in the tank, a second contact bridging member adapted to be engaged with and be disengaged from said fixed contacts, an armature core supporting said second bridging and a heater-current traversed coil for said armature core which, when energized, causes movement of said second bridging member into engagement with said fixed contacts to close said circuit and energize said heater.

5. In a control system for a domestic hot water tank, the combination with an electric circuit, a single electric heater in said circuit and a thermally-actuable heater control switch adapted to be subject to tank water temperature at the lower portion of the tank and adapted to be in closed position when subject to cold water and to be in open position when subject to hot water in the tank, of an upper heater control switch adapted to be subject to tank water temperature intermediate the ends of the tank comprising a single pair of fixed contacts connected in said circuit, a contact bridging member adapted to be moved into and out of engagement with said fixed contacts, a bimetal bar supporting and actuating said bridging member into engagement with said fixed contacts when subject to cold water in the tank, a second contact bridging member adapted to be engaged with and be disengaged from said fixed contacts, an armature core supporting said second bridging member and a heater-current traversed coil for said armature core which, when energized, causes movement of said second bridging member into engagement with said fixed contacts to close said circuit and energize said heater, said heater being deenergized by said lower thermally actuable switch when substantially all of the water in the tank is hot.

CLARK M. OSTERHELD.

REFERENCES CITED

The following references are of record in the file of this patent:

UNITED STATES PATENTS

| Number | Name | Date |
|---|---|---|
| 1,928,907 | Noble | Oct. 3, 1933 |
| 1,985,215 | Shivers | Dec. 18, 1934 |
| 1,996,625 | Pendleton | Apr. 2, 1935 |
| 1,996,634 | Vaughan | Apr. 2, 1935 |
| 2,039,030 | Reifenberg | Apr. 28, 1936 |
| 2,157,910 | McCormick | May 9, 1939 |
| 2,302,924 | Valverde | Nov. 24, 1942 |
| 2,376,537 | Hall | May 22, 1945 |